United States Patent [19]
Ohba

[11] 3,748,564
[45] July 24, 1973

[54] MOTOR CONTROL CIRCUIT

[76] Inventor: Shunjiro Ohba, 5969 N. Elston Ave., Chicago, Ill. 60646

[22] Filed: July 7, 1972

[21] Appl. No.: 269,743

[52] U.S. Cl.................... 318/587, 318/16, 180/6.5
[51] Int. Cl......................... G05d 1/00, B64c 16/18
[58] Field of Search............................ 318/16, 587; 180/6.5

[56] References Cited
UNITED STATES PATENTS

| | | | |
|---|---|---|---|
| 2,892,290 | 6/1959 | Ryan................................ | 318/16 X |
| 3,009,271 | 11/1961 | Kuehne et al................... | 318/587 X |
| 3,303,821 | 2/1967 | Harris................................ | 180/6.5 |
| 3,374,845 | 3/1968 | Selwyn............................ | 318/16 X |

*Primary Examiner*—B. Dobeck
*Attorney*—William E. Anderson et al.

[57] ABSTRACT

A remote-controlled vehicle has left and right driving wheels independently propelled by a pair of DC electric motors, with the vehicle being responsive to a control signal transmitted by a portable transmitter carried by a moving individual for transporting a load at a predetermined distance behind said individual. The vehicle has an improved electronic control system comprising a receiver for receiving the transmitted control signal and developing therefrom a range signal representative of the distance between the individual and the vehicle and a bearing signal representative of the heading of the vehicle relative to said individual. A DC amplifier circuit converts the bearing and range signals to left and right DC control signals. An astable multivibrator generates a pair of fixed-frequency pulse-train signals which are each converted to trapezoidal pulse-train signals by an integrating circuit. The left and right DC control signals are combined with the trapezoidal pulse-train signals and are applied to a threshold switching circuit which develops a variable-width rectangular pulse-train signal which is applied to the motor.

6 Claims, 4 Drawing Figures

PATENTED JUL 24 1973
3,748,564
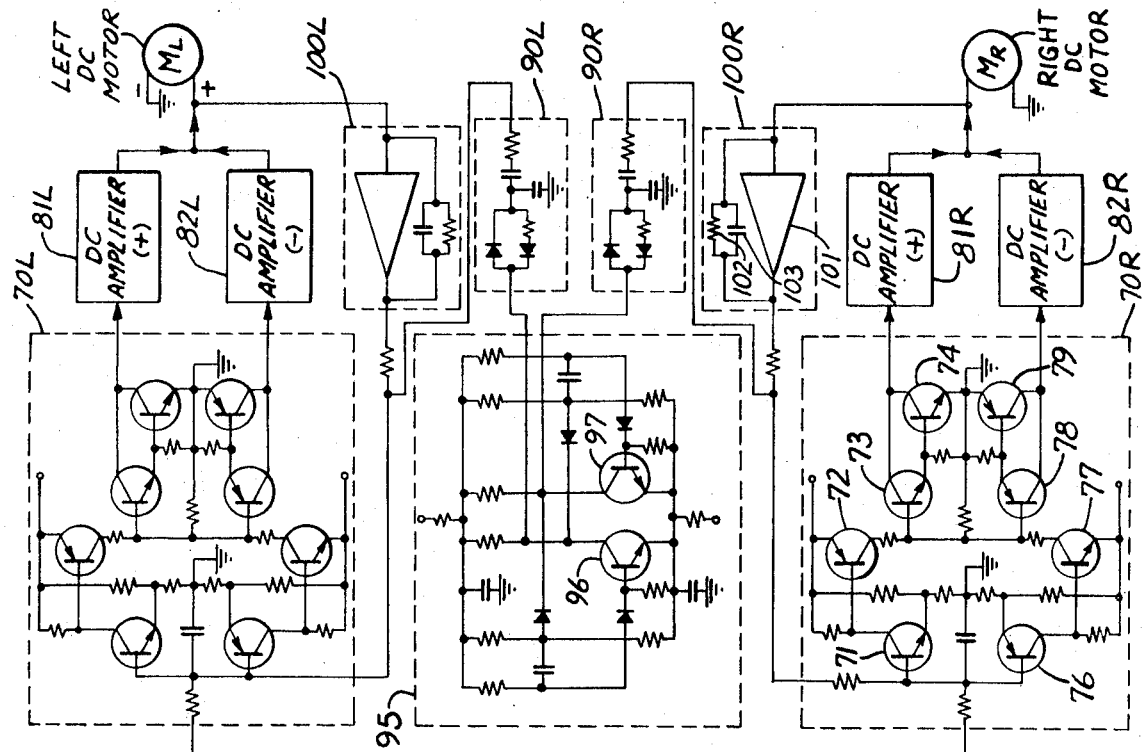
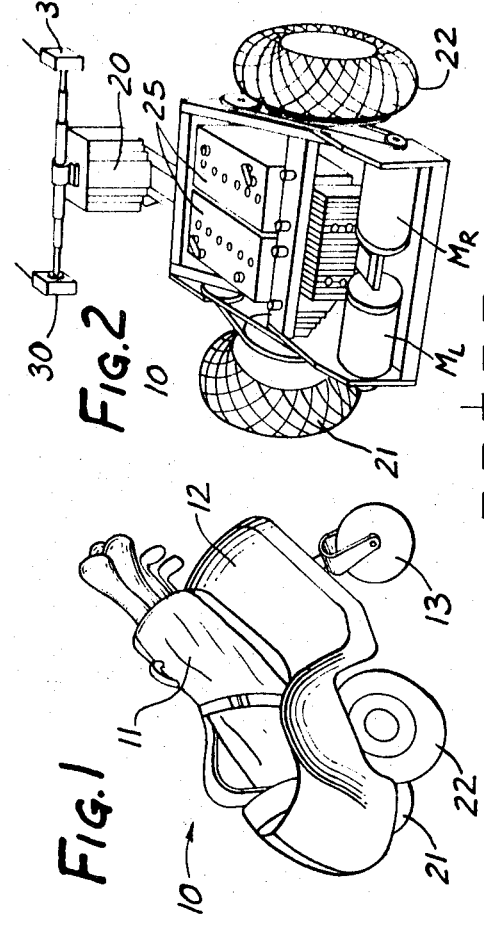
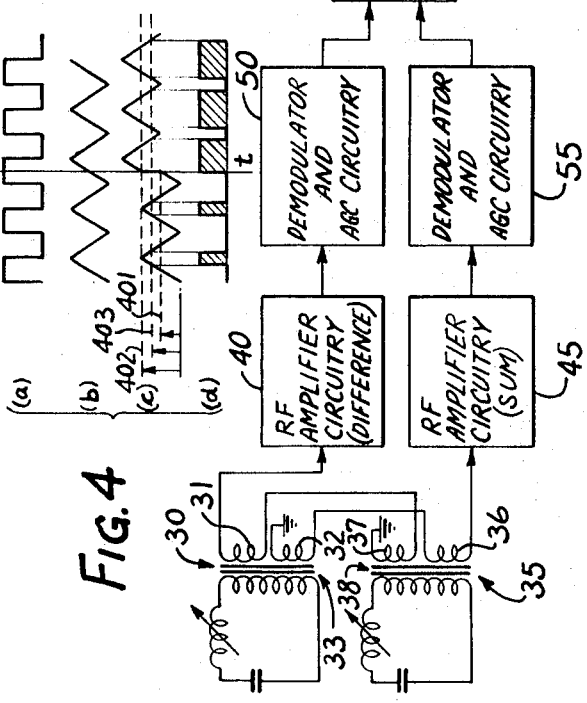
FIG.1
FIG.2
FIG.3
FIG.4

MOTOR CONTROL CIRCUIT

The present invention generally relates to remote-controlled motor-driven vehicles and, more particularly, to a DC motor control circuit for such a vehicle.

Motor-driven vehicles suitable for transporting a load of some sort and following a moving individual at a prescribed distance are known. One particular application for such a vehicle is a three-wheeled cart for carrying a golfer's golf bag, clubs, etc. The golfer carries a small radio transmitter in his pocket which transmits a control signal to a receiver in the cart so that, ideally, the cart follows the golfer around the golf course at a distance of approximately seven feet without either overrunning the golfer or falling too far behind him. Such carts are often used in preference to "riding" carts because they enable some golfers to enjoy the benefits of the exercise involved in walking around the golf course without suffering the burden of carrying a heavy bag of golf clubs and other equipment which may tend to tire the golfer and have an adverse affect on his playing ability.

Such carts are commonly driven by one or more DC motors which are powered by rechargeable storage batteries. Typically, a pair of antennas and a control circuit are employed to cause the cart to sense the intensity and relative direction of the transmitted signal to develop bearing and range control signals which are ultimately applied to the driving motor(s) to maintain the vehicle at the desired distance behind the golfer. Motors commonly used for such vehicles are relatively low-voltage (e.g., 12 volts), high current (e.g., 100 amps) devices; consequently, a DC amplifier is often employed to amplify the bearing and range control signals to a level suitable for application to the motors. Rheostats or variable resistors could be used to control the motors but such would result in lost power in terms of the energy dissipated in the resistance. Conventional circuits for controlling the driving motors in response to the bearing and range signals, however, are often inefficient and sluggish in that they consume a relatively large amount of power and do not precisely control the movement of the vehicle, especially when it is moving downhill.

Accordingly, it is an object of the present invention to provide an improved electronic DC motor control system for a remote-controlled, motor-driven vehicle of the type suitable for automatically transporting a load at a predetermined distance behind a walking individual.

It is another object of the invention to provide such a system which increases the efficiency of the vehicle and controls the DC motors more precisely than systems heretofore used.

Other objects and advantages of the invention are more particularly set forth in the following detailed description, and in the accompanying drawings, of which:

FIG. 1 is a perspective view of a vehicle constructed in accordance with the invention;

FIG. 2 is a perspective view of the veicle shown in FIG. 1 but with the outer portion removed to show the internal construction of the vehicle;

FIG. 3 is an electrical schematic diagram of a control circuit constructed in accordance with the principles of the invention and suitable for use in the vehicle illustrated in FIGS. 1 and 2; and FIG. 4 is a graphical representation of the wave forms of some of the signals in the circuit illustrated in FIG. 3.

With reference to FIGS. 1 and 2, there is generally shown a remote-controlled motor-driven vehicle 10 responsive to a control signal transmitted by a portable transmitter carried by a moving individual (neither is shown), such as a golfer walking around a golf course, for transporting a load such as a bag of golf clubs 11 at a predetermined distance (e.g., about seven feet) behind the individual. As illustrated, vehicle 10 is a typical three-wheeled cart with two rear driving wheels 21 and 22 independently propelled by separate DC electric motors $M_L$ and $M_R$, respectively, which are powered by a rechargeable storage battery 25. FIG. 2 is a perspective view of vehicle 10 shown in FIG. 1 but with the outer shell or housing 12 removed. A single front wheel 13 is made freely pivotable about a substantially vertical axis so that the vehicle may be steered by applying greater power to one rear wheel than to the other so as to turn the vehicle in a manner similar to that of a track type vehicle, such as an armored tank. The particular way in which the motors are coupled to the wheels forms no part of the invention and thus may be carried out in any suitable manner including a gear train, driving chain, or the like. A pair of antennas 30, 35 are provided for receiving the transmitted control signal and applying a corresponding electrical signal to electronic control circuitry contained in a housing 20 and discussed in greater detail below with reference to FIG. 3.

The transmitter used in conjunction with the system of the invention may be of any conventional type suitable for developing a control signal and propagating it a distance of up to 25 feet or so, depending on the particular circumstances in which the invention is used. The transmitter is preferably a small portable device which may be conveniently carried by the individual in his pocket or on his belt, etc. The transmitter should also have an on/off switch so that the individual may disable the remote-control system when, for example, he wishes to move close enough to the cart (i.e., with the aforementioned ten-foot following distance) to select a club, or while he is off the course such as when he is searching for a lost ball. The signal radiated by the transmitter may preferably be magnetic, rather than electromagnetic, so as to have a limited radiation range, similar to the signals radiated in some garage door opening systems or the like. Moreover, increased immunity of the control system to extraneous signals may be achieved by utilizing an RF carrier wave signal modulated with a predetermined "tone" signal and employing circuitry to detect both the carrier frequency and the modulation frequency. Thus, an extraneous signal having a component at the carrier frequency with an amplitude large enough to be detected by the control system will not actuate it. Carrier wave control signals of different frequencies may be used to enable each member of a group of golfers, for example, to use such a vehicle.

With reference to FIG. 3, there is shown an electrical schematic wiring diagram of a circuit constructed in accordance with the principles of the present invention which may be advantageously employed in the vehicle illustrated in FIGS. 1 and 2. In general, the illustrated embodiment of the invention comprises receiving means including antennas 30 and 35, RF amplifiers 40 and 45, and demodulators 50 and 55, for receiving the transmitted signal and developing therefrom a range signal representative of the distance between the individual and the vehicle and a bearing signal representative of the heading of the vehicle relative to the individual. Means comprising a DC amplifying and matrixing circuit 60 is responsive to the range and bearing signals for developing left and right DC control signals. Means including left and right threshold switching circuits 70L and 70R, an astable multivibrator 75, and a pair of integrating circuits 90L, 90R are responsive to the left and right DC control signals for developing corresponding left and right pulsed electrical signals each comprising a series of rectangular pulses having a pulse width and polarity that systematically vary in accordance with amplitude and polarity of the corresponding dc control ignal. The left and right variable-width pulsed signals are respectively applied to left and right motors $M_L$ and $M_R$ by means of two pairs of DC amplifiers 81L, 82L and 81R, 82R.

In accordance with an optional feature of the invention, more effective motor control is obtained by using a pair of feedback control circuits 100L, 100 R which integrate the motor voltage signal and apply a negative feedback signal to the input of control circuits 70L and 70R, respectively.

More particularly, the embodiment of the invention illustrated in FIG. 3 includes antennas 30 and 35 which may preferably comprise ferrite rods 33 and 38, respectively, having wound thereon primary windings 34 and 39, respectively, which are each tuned to the frequency of the control signal by a suitable capacitor and variable inductor tuning circuit. The range signal is developed by a pair of secondary windings 32, 36 of antennas 30, 35, respectively, which are connected together in phase to produce a signal representative of the sum of the two signals received by antennas 30 and 35. The bearing signal is developed by a pair of secondary windings 31, 37 of antennas 30, 35 respectively, which are connected together in phase opposition to develop a signal representative of the difference between the two signals received by antennas 30 and 35. The thus-developed AC bearing and range signals are applied to conventional RF amplifier circuits 40 and 45, respectively (assuming the transmitted control signal has a frequency in the radio frequency spectrum). RF amplifier circuits 40 and 45 may be of any conventional design suitable to amplify the AC input signals from each pair of secondary windings 31, 36 and 32, 37, respectively, to a signal level suitable for application to demodulator circuits 50 and 55, respectively. Demodulator circuit 50 converts the bearing input signal from RF amplifier circuit 40 to a DC bearing signal having an amplitude representative of the amount or degree of heading error and having a polarity representative of the relative direction, right or left, of the heading error. For example, the signal from left antenna 30 may be used as a reference such that, when the individual with the transmitter associated with vehicle 10 is located to the left of the vehicle, left antenna 30 receives a stronger or more intense signal than does right antenna 35; hence, the difference signal applied to RF amplifier 40 has a phase that is "positive." When the individual is located to the right of vehicle 10, however, left antenna 30 receives a weaker or less intense signal than does right antenna 35; hence, the difference signal has a phase that is "negative." Consequently, a positive DC output signal from demodulator 50 may be used to indicate a vehicle heading to the right of the individual; a negative DC output signal, to the left. This phase-polarity-direction relationship is arbitrarily chosen and may, of course, be selected in any suitable manner. Similarly, demodulator circuit 55 converts the AC range input signal from RF amplifier 45 to a DC range signal having an amplitude representative of the distance from the vehicle to the individual. The RF amplifier and demodulators per se, of the control system form no part of the invention and, if desired, this portion of the system may further include various design features such as automatic gain control (AGC), buffering, or limiting.

In the specific embodiment of the invention illustrated in FIG. 3, the DC output signals from demodulators 50 and 55 are coupled to a DC amplifier and matrix circuit 60 wherein the range (sum) and bearing (difference) signals are converted into "left" and "right" control signals which are respectively applied to left and right threshold switching circuits 70L and 70R to ultimately control left and right motors $M_L$ and $M_R$. Other embodiments of the invention may, of course, include different arrangements for utilizing the range and bearing signals to control the vehicle. For example, the bearing signal may be used to control the orientation of front wheel 13 of vehicle 10 to thus direct the vehicle in the desired direction and the range signal used to control both rear wheels 21 and 22 to control the speed of the vehicle to thus maintain the desired distance between the vehicle and the individual it is following. Another example is one in which the front wheel is used for both steering and driving the vehicle, similar to a front-wheel-drive automobile.

DC amplifier and matrix circuit 60 may comprise conventional circuitry including, for example, a plurality of operational amplifiers (not shown) which both amplify the input DC bearing and range signals and matrix or cross-couple them such that the DC output signals of circuit 60 are in the form of "left" and "right" DC control signals which may be utilized to control left and right motors $M_L$ and $M_R$ to control the speed and direction of the vehicle.

At this point it is convenient to note that if identical motors and coupling mechanisms are used for left wheel 21 and right wheel 22, then in order to drive the vehicle forward in a straight line it is necessary to apply equal-amplitude but opposite-polarity control signals to motors $M_L$ and $M_R$. This is due to the fact that the motors are generally more conveniently mounted with their output driving shafts facing in opposite directions, as shown in FIG. 2. Thus, assuming that the bearing signal is zero, DC amplifying and matrixing circuit 60 develops "left" and "right" DC control signals of equal amplitude but opposite polarity. Consequently, motors $M_L$ and $M_R$ are driven at the same speed but in opposite directions so that the vehicle moves forward in a straight line. On the other hand, assuming that the range signal is zero, circuit 60 develops "left" and "right" DC control signals of equal amplitude and the same polarity. Consequently, motors $M_L$ and $M_R$ are driven at the same speed and in the same direction so that the vehicle turns. When neither the range nor the bearing signal is zero, the "left" and "right" control signals represent the cumulative effect of the two input signals such that the vehicle may be simultaneously turned and moved toward the individual. The vehicle moves forward as long as it is not within a predetermined range (e.g., 7 feet) and turns according to the relative values of the "left" and "right" DC control signals. For example, the vehicle may be turned to the left when the value of the "left" control voltage is more positive than that of the "right," and to the right when the value of the "left" control voltage is more negative than that of the "right." Thus, for example, if the range signal indicates that the vehicle should move closer to the individual and the bearing signal indicates that the vehicle should turn to the left in order to move in a direction toward the individual, then both motors $M_L$ and $M_R$ would be actuate but right motor $M_R$ would initially be driven harder than left motor $M_L$ so that the vehicle would both align itself in a direction towards the individual and move in that direction.

In accordance with the illustrated embodiment of the invention, threshold switching circuits 70L and 70R are responsive to the left and right DC control signals and the output signals from integrating circuits 90L and 90R for respectively developing the left and right pulse-train electrical signals which are applied to DC amplifiers 81L, 82L, 81R, and 82R. The construction and operation of switching circuit 70L, DC amplifiers 81L and 82L, integrating circuit 90L, feedback circuit 100L, and motor $M_L$ is essentially identical to that of switching circuit 70R, DC amplifiers 81R and 82R, integrating circuit 90R, feedback circuit 100R, and motor $M_R$ so only the latter is described in detail. Astable multivibrator 95 is a conventional circuit comprising a pair of switching transistors 96,97 and associated biasing and timing circuitry for generating a pair of rectangular pulse-train signals (FIG. 4a) having a constant repetition rate and uniform pulse width which are applied to integrating circuits 90L and 90R.

Integrating circuit 90R changes the rectangular pulse-train signal from multivibrator 95 to a trapezoidal pulse-train signal (FIG. 4b) which it applies to the input of threshold switching circuit 70R. The right DC control signal (level 401 in FIG. 4c) is also applied to the input of threshold switching circuit 70R to thus determine the DC level of the trapezoidal pulse-train signal. It should be noted that it is not essential to use a signal having a trapezoidal waveform; any periodic signal having sloping leading and trailing edges for each cycle is suitable for the purposes of the invention (e.g., a triangular waveform).

Threshold switching circuit 70R comprises four switching transistors 71, 72, 73 and 74 and the associated biasing circuitry which respond to the trapezoidal pulse-train signal exceeding a predetermined positive voltage level to produce an output signal which is applied to DC amplifier 81R. When the trapezoidal pulse-train signal falls below the predetermined positive voltage level, no output signal is produced. Thus, by selecting a threshold switching level (level 402 of FIG. 4c) that occurs somewhere on the slanted leading and trailing edges or the "slopes" of the trapezoidal waveform, the trapezoidal pulse-train signal is converted to a positive rectangular pulse-train signal which is applied to motor $M_R$ by means of DC amplifier 81R. By utilizing the right DC control signal to vary the DC level of the trapezoidal pulse-train signal, the point on the trapezoidal slopes that is equal to the threshold switching voltage is correspondingly varied to thus produce a constant-amplitude rectangular output signal having a pulse width that varies in accordance with the right DC control signal. If, at time t in FIG. 4, the right DC control voltage changes to a different level (level 403 in FIG. 4c), then the points on the slopes of the waveform corresponding to detection or threshold level 402 changes to produce a wider pulse, as shown in FIG. 4d. Threshold switching circuit 70R is made symmetrical by including four complementery switching transistors 76, 77, 78, and 79 and the associated biasing circuitry to respond to a corresponding predetermined negative threshold voltage to similarly apply a negative rectangular pulse-train signal to motor $M_R$ by means of DC amplifier 82R. Motor $M_R$ is thereby driven at a torque corresponding to the width of the rectangular driving pulses and in a direction corresponding to the polarity of the pulses.

In accordance with an optional aspect of the illustrated embodiment of the invention, a feedback control circuit 100R is provided to improve the operation characteristics of the motor control circuit. Feedback control circuit 100R includes an operational amplifier 101 having a feedback circuit comprising a resistor 102 and a capacitor 103 for integrating the signal appearing at the input terminal of motor $M_R$ (a voltage comprising the combination of the applied pulse-train signal plus the emf of the motor) and applying a corresponding DC signal to the input of threshold switching circuit 70R. This causes motor $M_R$ to operate in a speed controlled mode rather than torque controlled mode used in conventional controllers. In addition, the circuit provides dynamic braking when the range control signal decreases the motor speed. Moreover, when the vehicle is moving in a downhill manner, the circuit of the invention provides more efficient braking even when the vehicle changes its heading.

Thus there has been shown and described an improved electronic DC motor control system for a remote-controlled, motor-driven vehicle of the type suitable for automatically transporting a load at a predetermined distance behind a walking individual. By developing a train of variable-width, constant-amplitude pulses to control the DC motors of the vehicle, minimum power is lost in rheostats or other power-consuming devices used to control the torque output of the motors. Moreover, by integrating the input signal to the motors (plus the motor emf) and developing a corresponding DC signal which is applied to the input of the motor control circuits, thus R.P.M. control and dynamic braking is obtained.

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. In a remote-controlled vehicle having left and right driving wheels independently propelled by a pair of DC electric motors, said vehicle responsive to a control signal transmitted by a portable transmitter carried by a moving individual for transporting a load at a predetermined distance behind said individual, an improved electronic control system comprising:

means for receiving said transmitted control signal and developing therefrom a range signal representative of the distance between said individual and said vehicle and a bearing signal representative of the heading of said vehicle relative to said individual;

means responsive to said range and bearing signals for generating respective left and right pulse-train electrical signals each comprising a series of pulses having a pulse width and polarity that systematically vary in accordance with the range and bearing signals;

and means for applying said left pulse-train electrical signal to the motor propelling said left driving wheel and said right pulse-train electrical signal to the motor propelling said right driving wheel.

2. A system according to claim 1, which further comprises means responsive to said range and bearing signals for developing a left DC control signal and a right DC control signal, and said generating means is responsive to said left and right DC control signal for generating said respective left and right pulse-train signals each comprising a series of rectangular pulses having a pulse width and polarity that systematically vary in accordance with the amplitude and polarity of the corresponding DC control signal.

3. A system according to claim 2, in which said generating means comprises means for generating a pair of trapezoidal pulse-train signals having DC voltage levels that systematically vary in accordance with said left and right DC control signals, respectively, and a threshold switching means responsive to a predetermined threshold switching voltage for generating said left and right pulse-train signals.

4. A system according to claim 3, in which said trapezoidal pulse-train generating means comprises an astable multivibrator for generating a pair of rectangular pulse-train signals, and a pair of integrating circuits coupled to said multivibrator for converting said rectangular pulse-train signals into said pair of trapezoidal pulse-train signals.

5. A system according to claim 2, which further comprises a pair of feedback control circuits coupled from said motors to said generating means for applying a DC signal to said generating means representative of the operating characteristics of the respective one of said motors, thereby providing improved motor speed control.

6. A system according to claim 5, in which each said feedback control circuit comprises an integrating circuit.

* * * * *